United States Patent [19]
Khoshevis

[11] Patent Number: 5,656,230
[45] Date of Patent: Aug. 12, 1997

[54] ADDITIVE FABRICATION METHOD

[75] Inventor: Behrokh Khoshevis, Los Angeles, Calif.

[73] Assignee: University of Southern California, Los Angeles, Calif.

[21] Appl. No.: 623,320

[22] Filed: Mar. 26, 1996

Related U.S. Application Data

[62] Division of Ser. No. 382,869, Feb. 3, 1995, Pat. No. 5,529,471.

[51] Int. Cl.$^6$ .................. B29C 35/08; B29C 41/02; B29C 41/52
[52] U.S. Cl. .................. 264/401; 264/40.7; 264/308
[58] Field of Search .................. 264/40.7, 255, 264/308, 401

[56] References Cited

U.S. PATENT DOCUMENTS

| | | | |
|---|---|---|---|
| 4,247,508 | 1/1981 | Housholder | 264/308 X |
| 4,734,021 | 3/1988 | Maddock | 425/60 |
| 4,749,347 | 6/1988 | Valavaara | 425/135 |
| 5,059,266 | 10/1991 | Yamane et al. | 264/401 X |
| 5,260,009 | 11/1993 | Penn | 264/401 |

FOREIGN PATENT DOCUMENTS

3638850  4/1988  Germany ................. 425/375

*Primary Examiner*—Leo B. Tentoni
*Attorney, Agent, or Firm*—Pretty, Schroeder & Poplawski

[57] ABSTRACT

An additive fabrication method using a fluid construction material which can be solidified, trowels defining first and second surfaces, and a nozzle for delivering fluid material to a predetermined location, including the steps of moving the trowels and nozzle along a predetermined path defining an enclosed area, delivering fluid material to the nozzle to extrude the material in a layer as the nozzle is moved along the path, with the first and second surfaces moving with the nozzle to produce a wall of the extruded material forming an enclosed area with a shaped outer surface and a shaped top surface, and delivering fluid material to the enclosed area.

14 Claims, 8 Drawing Sheets

ADDITIVE FABRICATION METHOD

This application is a division of application Ser. No. 08/382,869, filed 03 Feb. 1995, now U.S. Pat. No. 5,529,471.

BACKGROUND OF THE INVENTION

This invention relates to additive fabrication apparatus and methods, generally known as rapid prototyping techniques. Such techniques have found applications in: small batch actual production of parts or assemblies; prototyping of products to test functionality, fit for assembly, marketability, and other factors; mold, die and other tool making for other manufacturing processes such as casting, extrusion, EDM, etc.; and solid imaging of 3D data in domains such as mathematics, chemistry, medicine, etc., and sculpturing and other forms of art work.

The major advantages of additive fabrication over the subtractive techniques such as metal cutting are: the ability to produce parts with unlimited geometrical complexity; the radically new possibility of designing the internal structure of parts; the possibility of unattended and automated operation; and the possibility of wasteless and environmentally sound fabrication.

Due to the current global interest in shortening the product design and manufacturing cycle which is essential in the current competitive world market and due to the recent environmental concerns, additive processes are receiving a great deal of attention. The present invention is related to a new additive fabrication apparatus and method that has several superior features as compared with the existing techniques.

Currently available additive automated fabrication techniques are briefly described below.

Selective photocuring: The original SteroLithography and its variations fall in the category of selective photocuring. In these processes selective portions of successive layers (corresponding to cross sections of the object being built) of a special type of polymer resin are solidified by exposure to light.

Selective sintering: In this process desired sections of thin successive layers of thermoplastic or metal powder are melted such that the powder particles are melted and fused together to form cross sections of the object.

Robotically guided extrusion: This process forces thermoplastic paste through an extrusion nozzle which is moved about by a robotic arm to lay down the molten material in desired locations of each successive layer of the object.

Droplet deposition on powder: In this process an adhesive liquid is ejected, usually by techniques similar to that used in the ink jet printers, to a thin powder layer to selectively join the powder particles to form solid cross sections of the object. The composite object may be later cured by heat for improved strength. This process is usually called 3D Printing.

Adhesion of cut sheets: This process separately cuts (usually by laser) the contour of each cross section of the object on sheets of a laminating material (usually butchery paper). The cut layers are successively laminated by heat to create the final object.

Other techniques under development: Three dimensional welding in which a welding head is robotically guided to progressively melt and fuse (usually nickel-based steel) to build the desired object; controlled deposition of liquid droplets of various materials (recently metal) to progressively build the object layer-by-layer; and selective curing of photopolymer by two laser beams that meet at the curing points in a vat of liquid resin (the only method that does not use the successive layering technique) are some of the rapid prototyping processes that are currently under development. Most of these methods, especially the latter one, are far from being commercially feasible due to several major difficulties in creating acceptable part surface qualities and dimensional tolerances.

All of the current additive processes, with the exception of the two-laser method, use the layering approach which builds up the object in horizontal layers each about 0.1 to 0.25 mm thick. Consequently, 40 to 100 layers for each vertical centimeter (100 to 250 layers per vertical inch) are built by these processes.

The most popular processes are currently based on polymer selective photocuring. Although photocuring machines are the most expensive type of rapid prototyping equipment and photopolymers are the most expensive materials used in rapid prototyping, due to the accuracy of selective photocuring, this process is most widely used today. Photopolymer is an organic resin that solidifies (cures) under light in a particular range of wavelength (usually in the ultraviolet range). One of the reasons for the attractiveness of photopolymers is that they can be stored as liquid for a long time and then be solidified during manufacturing. The required light for photopolymer curing is provided either by a scanning laser beam or by a flood lamp which shines light through a masked sheet which lets the light through where the layer is to solidify.

The current photocuring systems build the object in a vat of liquid polymer. As each layer is cured, a new resin layer covers the cured layer by either vertically moving the object to a lower depth in the vat, or by pouring more resin into the vat. When the last layer is cured either the object is raised or the vat is drained to remove the fabricated object from the vat. Another approach for layer creation builds the object as it is suspended from an ascending platform. For each new layer the liquid resin is poured in a thin layer on a plate of glass just below the last layer of the object. The bottom surface of the glass platform is exposed to either laser or flood lamp light for curing.

When a laser beam is used for photocuring certain sections of each resin layer are scanned by the beam according to the 2D geometry of the related cross section of the object. The scanned sections solidify and the rest of the layer remain in liquid form. The laser method is potentially more energy efficient since it emits light only on specific surfaces and the monochromic nature of the laser beam results in more uniform curing for thicker layers.

In the flood lamp approach a mask sheet is created, usually using ordinary laser printers and and transparent sheets. For each layer a mask sheet must be created. Excessive mask sheet consumption and complication in accurately feeding each sheet to the desired position may be considered as serious disadvantages of this technique. Certain methods use a single glass sheet which is electrostatically charged in desired sections. Black toner particles are then attracted by the charged sections. After light exposure the sheet is discharged, the toner is collected, the liquid polymer in sections of the layer which are not exposed to light are vacuumed and the process is repeated for the new layer on the same glass sheet.

The flood lamp approach has two important advantages: first, the curing process for each layer may be much faster since the entire desired section of the layer is exposed instantly and simultaneously to light, and second, the broad spectrum of lamp light make the process less sensitive to variations in the polymer material, whereas a laser requires the polymer to be tuned to its specific frequency.

Major drawbacks of the current rapid prototyping equipment, and methods include the following:

a) The processes are slow (typically between 5 to 70 hours for relatively small objects).

b) The parts fabricated by the current processes generally have poor surface quality.

c) Parts created with most of the current methods have weak structures.

d) There is a limited choice of materials that may be used. Some of these materials are relatively expensive (e.g. approximately $250 per pound for photopolymers).

e) Current methods are limited to fabrication of part dimensions that are generally less than one meter in each dimension.

f) The commercial machines using the current approaches are expensive (between $50K and $3M, with an average of $300K). Cost is especially high if laser or photo masking is used or if the processing machine has a large work envelope. Precision is also a big factor in the cost of the new methods.

It is an object of the present invention to provide a new and improved apparatus and method for additive fabrication of products, including apparatus and method which can be automated.

SUMMARY OF THE INVENTION

The additive fabrication apparatus of the invention uses a fluid construction material which can be solidified, and includes trowel means defining a side surface, first nozzle means for delivering fluid material to a predetermined location, first control means for moving the first nozzle means along a predetermined path defining an enclosed area and for moving the trowel means along the predetermined path, first supply means for delivering fluid material to the first nozzle means to extrude the material from the first nozzle means in a layer as the first nozzle means is moved along the path, with the trowel means side surface producing a wall of the extruded material forming the enclosed area with a shaped outer surface and a top surface, second nozzle means for delivering fluid material to the enclosed area, second control means for moving the second nozzle means to position the second nozzle means at the enclosed area, and second supply means for delivering fluid material to the second nozzle means to fill in the enclosed area.

The apparatus preferably includes means for solidifying the material in the area, and also preferably includes first and second trowels for shaping the side and top surfaces. Various mechanisms may be used for moving the trowels to define various shaped surfaces.

The additive method of the invention for fabricating a product using a fluid construction material which can be solidified, trowel means defining a side surface, and first nozzle means for delivering the fluid material to a predetermined location, includes the steps of moving the first nozzle means along a predetermined path defining an enclosed area, moving the trowel means along the predetermined path, delivering fluid material to the first nozzle means to extrude the material from the first nozzle means in a layer as the first nozzle means is moved along the path, with the trowel means side surface producing a wall of the extruded material forming the enclosed area with a shaped outer surface and a top surface, and delivering fluid material to the enclosed area, filling in the area enclosed by the wall.

The method preferably includes moving the trowel means to form a shaped side surface and a shaped top surface.

DESCRIPTION OF THE PREFERRED EMBODIMENTS

Figure 1:
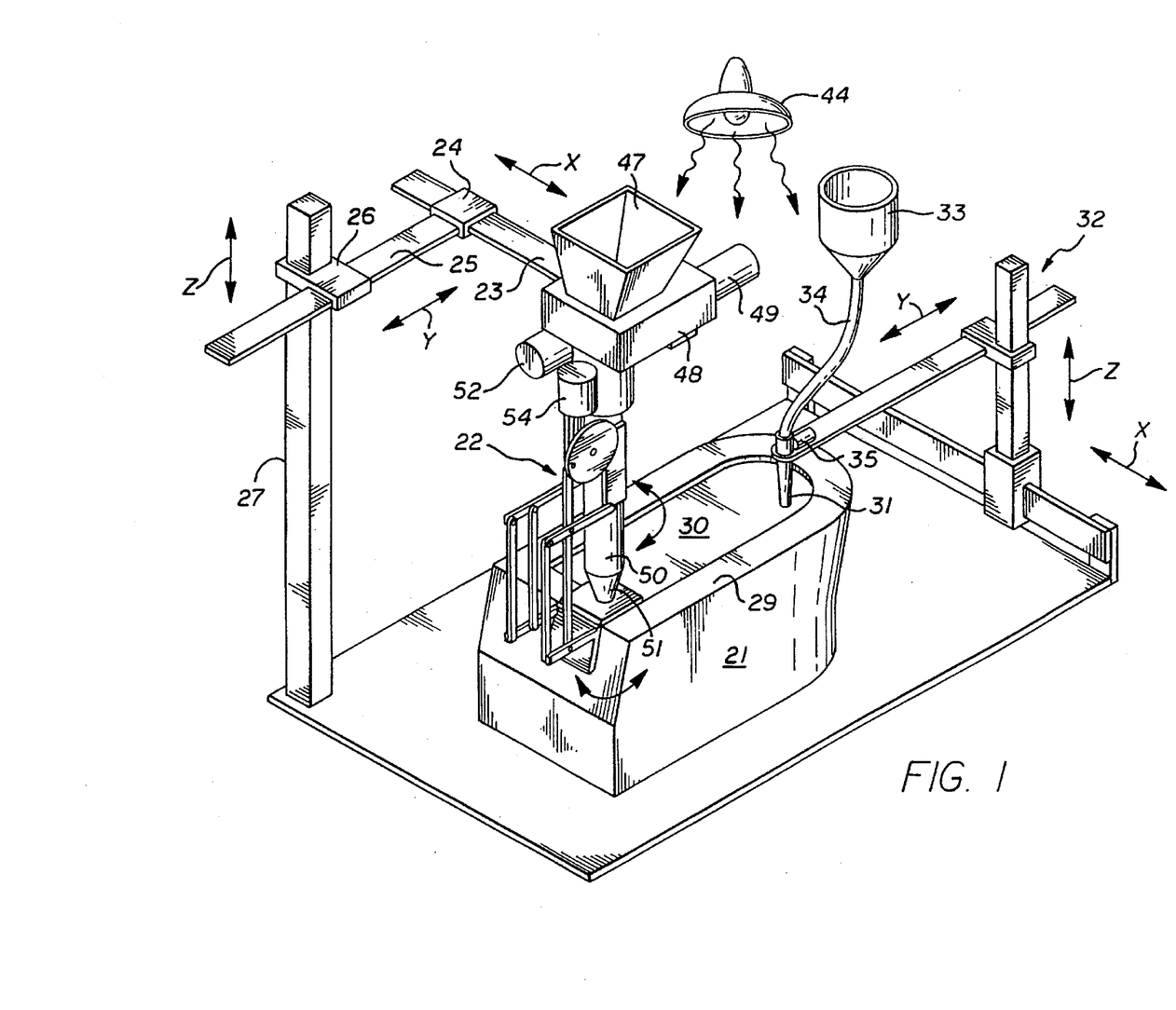
FIG. 1 is a perspective illustration of an apparatus for additive fabrication of products and incorporating the presently preferred embodiment of the invention.

The presently preferred embodiment of the additive fabrication apparatus of the present invention is shown in FIG. 1, with an object 21 being created by the method of the invention utilizing the apparatus of FIG. 1. A fluid material extrusion assembly 22 is supported on an arm 23 of a conventional three axis servo controlled positioning system. The arm 23 is moved in the X direction by a drive 24 carried on another arm 25 which in turn is moved in the Y direction by a drive 26, which also drives the arm 25 in the Z direction on a post 27. The drives 24, 26 will be controlled by a conventional computer such as is used in present day numerically controlled machine tools and the like, to move the extrusion assembly 22 along a predetermined path defining an enclosed area. In the embodiment illustrated in FIG. 1, the predetermined path is the rim 29 of the object 21, which encloses the area 30.

A nozzle 31 is driven by another servo controlled positioning system 32 to position the nozzle 31 at the area 30 for delivering a fluid construction material from a container 33 through a line 34 and a control valve 35 to the nozzle 31. The nozzle 31 and its associated control mechanism is utilized to fill in the area 30 formed by the rim 29.

Figures 2, 3, 4:
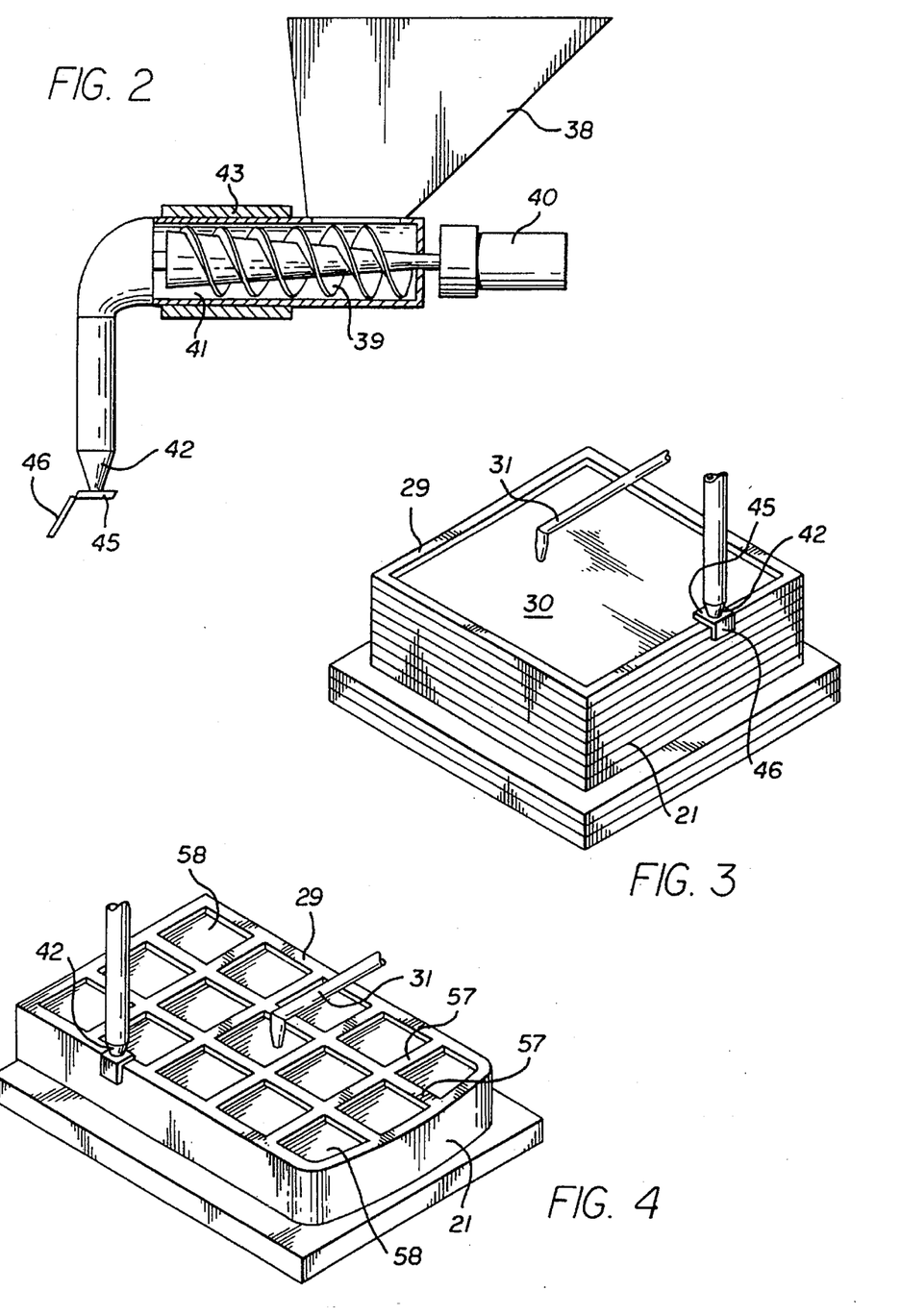
FIG. 2 is a side view illustrating one form of apparatus for delivering fluid material to the apparatus of FIG. 1.
FIG. 3 is a perspective view illustrating the operation of the apparatus of FIG. 1.
FIG. 4 is a view similar to that of FIG. 3 illustrating an alternative embodiment of the invention.

A simple form of the extrusion assembly is shown in FIG. 2, with a supply container 38 and a helical or auger feeder 39 driven by a motor 40 through a tube 41 to a nozzle 42. If desired, a heater 43 may be positioned around the tube 41. A top trowel 45 and a side trowel 46 are positioned adjacent the nozzle 42.

A fluid construction material is placed in the container 38 and is extruded through the nozzle 42 onto the object being created, to form the rim 29. In the embodiment illustrated in FIG. 2, the trowel 45 defines the top surface of the rim and the trowel 46 defines the side surface of the rim. Both trowels are planar.

The fluid construction material must be able to be softened to a fluid state for extrusion and/or pouring, and must be able to be solidified. Conventional casting and polymer photocuring materials may be utilized. Thermoplastics, photopolymers, plaster, epoxy, cement, metals and the like are suitable. The same material may be utilized with the extrusion assembly 22 and the nozzle 31, or different materials may be utilized, as desired. The extruded material from nozzle 42 preferably is a paste, while the material from nozzle 31 preferably is a liquid.

Preferably a means 44 for solidifying the extruded material and the poured or injected material is included in the apparatus. The materials may be solidified by ultraviolet radiation, heat, cool or dry air, and the like, depending on the nature of the material.

The operation of the additive fabrication apparatus is illustrated in FIG. 3 in the formation of an object. In this illustration, the top trowel 45 is horizontal and the side trowel 46 is vertical so as to form a square corner at the upper outer edge of the rim 29. A succession of rims 29 have been extruded one on top of the other, with the area 30 within each rim filled in from the nozzle 31, prior to forming the next rim.

Figure 12:
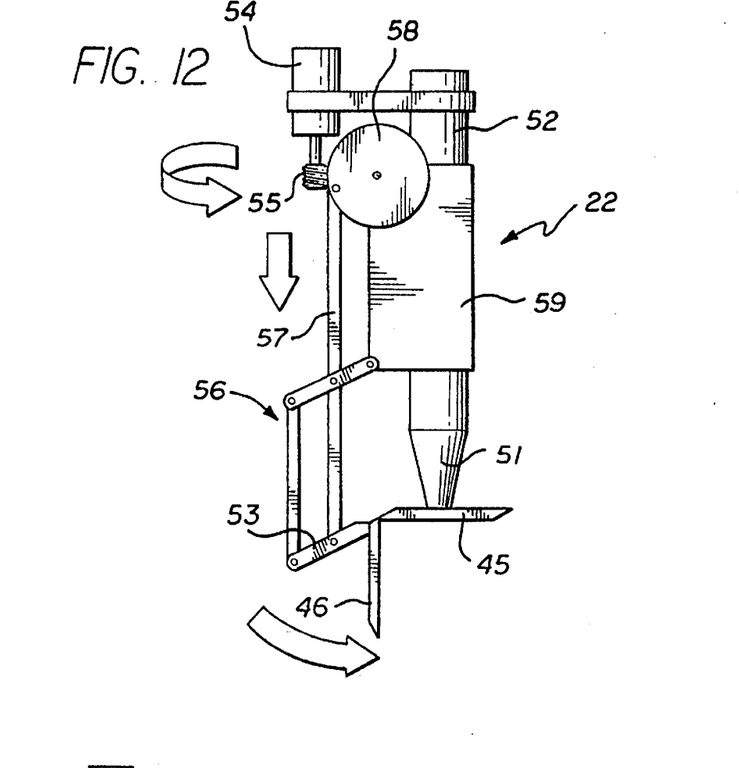
FIG. 12 is a side view of an extrusion assembly with a fixed top trowel and a moveable side trowel.

A more complex construction for the extrusion assembly 22 is shown in FIGS. 1 and 12. The construction material is fed from a container 47 into an extrusion unit 48 with the auger driven by a motor 49. The material is forced out and downward through a sleeve 50 and nozzle 51, with the sleeve and nozzle being rotated by another motor 52. In this embodiment, the top trowel 45 is maintained in a horizontal position, while the side trowel 46 may be pivoted from the vertical position to provide any desired angle for the side of the rim. The side trowel 46 is mounted on an arm 53 edge-to-edge with the top trowel 45, and is pivoted by a motor 54, worm gear drive 55, and parallelogram linkage 56, with the arm 57 raised and lowered by rotation of the gear 58. The motor 54, the gear 58, and one of the arms of the parallelogram linkage are supported by mounting brackets 59.

Figure 13A:
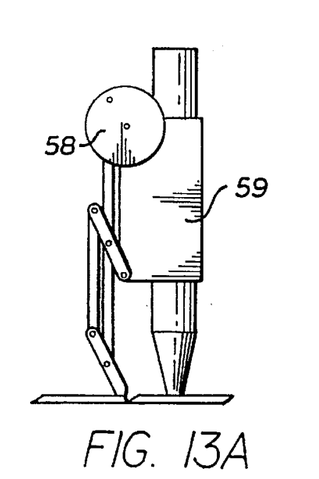
FIGS. 13A, 13B and 13C are side views illustrating the operation of the apparatus of FIG. 12.
Figure 13B:
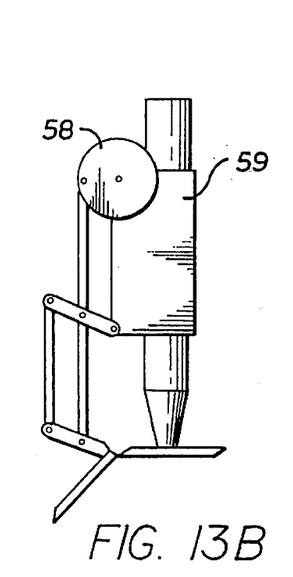
Figure 13C:
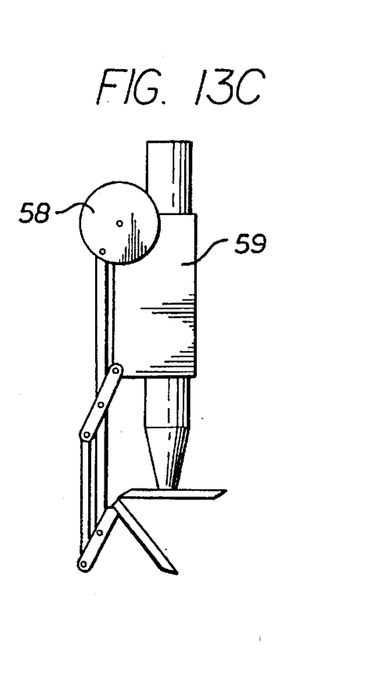

The various positions obtainable for the side trowel with the mechanism of FIG. 12 are illustrated in FIGS. 13A, 13B and 13C.

Figure 14:
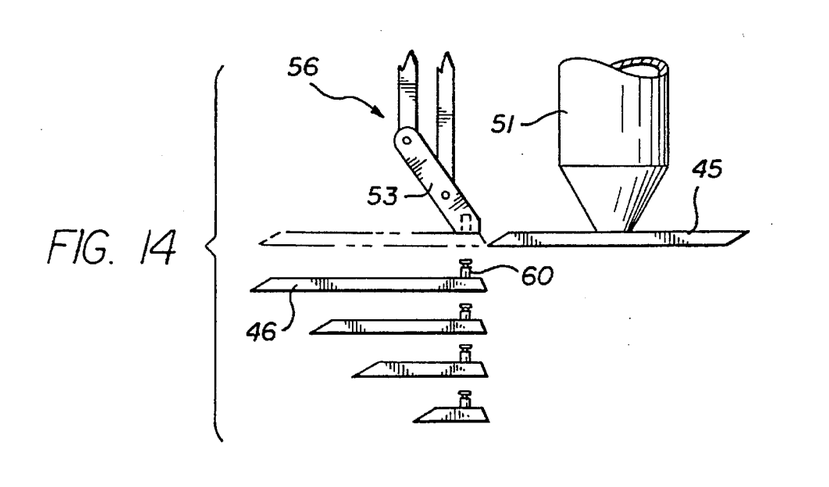
FIG. 14 is a view similar to that of FIGS. 12 and 13A–C illustrating utilization of side trowels of various heights.
Figure 15:
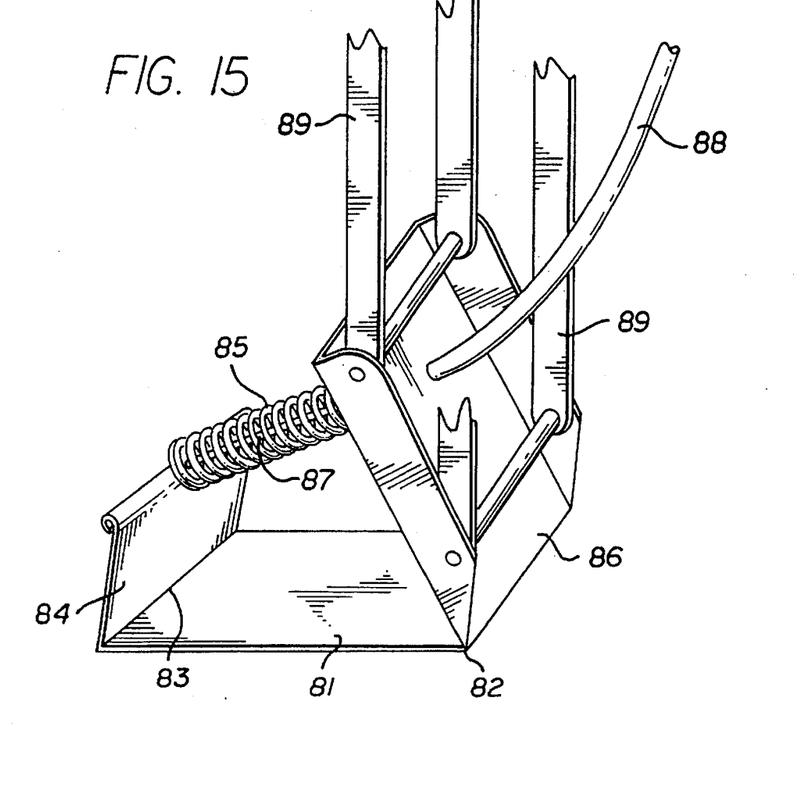
FIG. 15 is a perspective view of a trowel assembly which can provide a curved surface as well as a planar surface.

Various sizes for the side trowel 46 may be utilized, with four different sizes substitutable for each other shown in FIG. 14. A boss 60 on the trowel 46 preferably is a snap fit into a mating opening in the arm 53.

In operation, material is delivered to the nozzle 51 to extrude the material in a layer forming the rim 29 as the nozzle is moved along the path determined by the X, Y, Z positioning drive. The top and side trowels form the rim for enclosing the area, with a shaped outer surface and a shaped top surface corresponding to the shape of the trowels, planar in the embodiment illustrated. The fabrication apparatus may be produced with only one trowel, a side trowel which provides the desired shape, smoothness and accuracy for the side surface of the rim, with the shape of the top surface depending on the extrusion nozzle. The side trowel could be changed in position to also provide a shape for the top surface. However, the preferred embodiment utilizes both a top trowel and a side trowel.

After the rim has been formed utilizing the extrusion assembly 22, the area enclosed by the rim is filled using the nozzle 31 to complete the layer. Then the process is repeated to produce the next layer.

An important feature of the apparatus and process of the invention is the ability to create smooth and accurate surfaces at relatively high speed. The utilization of the trowels enables rapid creation of smooth object surfaces with great accuracy. Utilization of the now conventional computer control for positioning the nozzle provides creation of smooth and accurate surfaces which may be planar or which may have complicated free form shapes. The layering method permits creation of various surface shapes using only the two trowels, instead of a variety of tools needed in more traditional sculpturing and plastering.

Internal walls 57 can be extruded within each layer to create square or other shapes of hatches 58, as shown in FIG. 4. The hatching process may be useful for large objects since with some materials curing may start before the liquid filler material spreads over the entire area. With the hatching step, each hatch is separately filled with the construction material, allowing more control of the spread and solidification of the material. Also, the hatching method can be utilized for concurrent extrusion of rims and pouring of filler.

Figure 5:
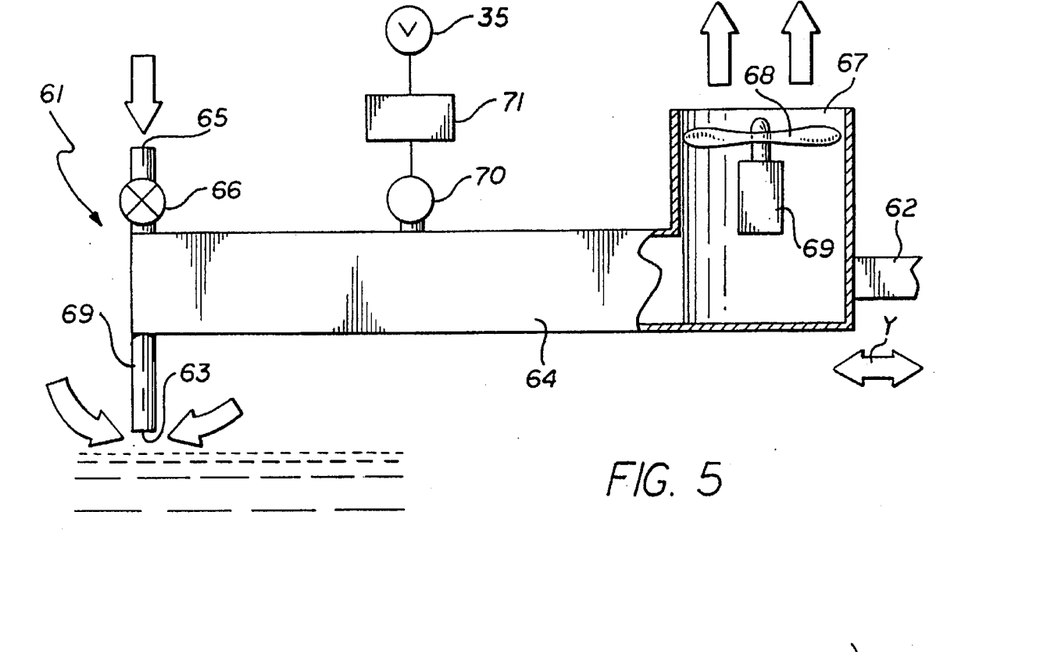
FIG. 5 is a diagrammatic illustration of an apparatus for controlling the flow of material in filling an enclosed area.

The area pouring nozzle 31 may be moved by the positioning system to various locations within the area. A control system for controlling the position and pouring from the nozzle 31 is illustrated in FIG. 5.

A filling sensor system 61 is carried on the Y axis on arm 62 of the positioning system for the nozzle 31, with a probe tip 63 positioned beside the nozzle 31. The system includes a chamber 64 with an air inlet 65 and adjustment valve 66, and an air outlet 67 with a fan 68 driven by a motor 69. The probe tip 63 is also connected to the chamber 64 by a line 69. A pressure sensor 70 is connected to the chamber 64 and provides a pressure reading for a control unit 71 which functions to shut off the valve 35 feeding material to the nozzle 31, when the sensed pressure drops below a predetermined value.

In operation, air is fanned out of the chamber 64 while the sensor 70 registers the air pressure in the chamber. As the area enclosed by the rim fills, the top layer of the surface of the poured liquid approaches the probe tip 63 and the flow of air into the chamber reduces, with a corresponding drop in sensed chamber pressure.

Pouring of liquid into the area to be filled through the nozzle 31 is stopped when the sensed pressure corresponds to the desired liquid surface level. The filling of the enclosed area may be performed after each rim is produced, or may be performed after several layers of rim are completed. If desired, the filling nozzle 31 may be positioned adjacent the extrusion nozzle 51 for movement by a single X, Y, Z motion control mechanism, alternatively extruding a rim and filling the enclosed area. Of course, the probe tip 63 could be supported by a separate position control system rather than being carried by the same system which supports the nozzle 31. Ordinarily, this would merely complicate the mechanism without achieving any particular advantage.

One important characteristic of the extrusion process of the present invention is that the wall surface of the rim that faces the internal part of the object does not need to have a controlled shape, since it will be covered and bonded with the poured liquid. Therefore, regardless of the variations in the rate of extrusion, the outer and top sides of the extruded wall will be accurately controlled by the trowels. This allows for a less accurate and less elaborate extrusion mechanism which may be much less expensive than the mechanisms used in the current robotically guided extrusion machines. Note that in the current robotically guided extrusion system the width of each section created by one pass of extrusion has to be accurately controlled, since the entire surface of the layer is created using zigzagged extrusion passes that have to be perfectly adjacent with no gap between them.

It should also be noted that when a hatching configuration of FIG. 4 is used, the shapes of both sides of the internal walls are unimportant, as they are later covered and bonded with liquid material. Therefore, when extruding internal walls the side trowel is not required. Also a plurality of the pouring nozzles 31 may be used to fill a plurality of areas simultaneously.

Figure 6:
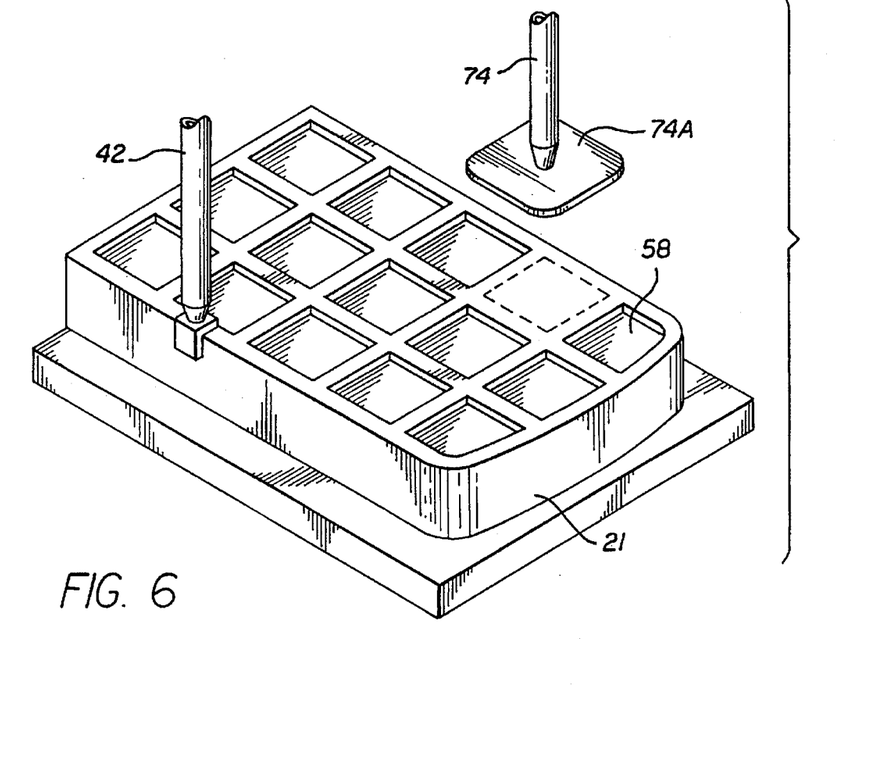
FIG. 6 is an illustration similar to that of FIG. 4 showing an alternative embodiment.

When a filling material is used in the paste state, the area may be filled by injection. FIG. 6 shows an injection assembly 74 whereby each hatch or area 58 is individually filled by injection with the paste material. Preferably the assembly 74 includes a plate 74A which is larger than the enclosed area and rests on the rim. After each injection the injection nozzle makes a horizontal move (in any direction) to disconnect the injected material from the material inside the injection nozzle.

Figure 7:
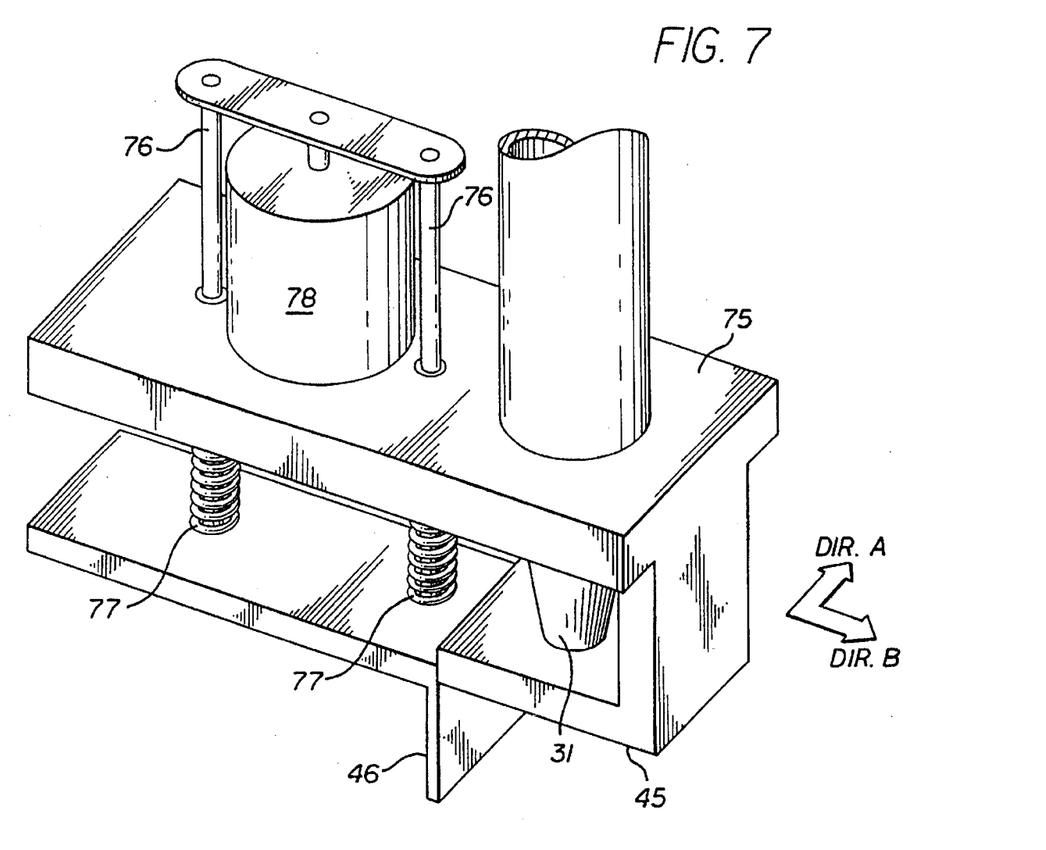
FIG. 7 is a perspective view of one embodiment of a fluid material extrusion assembly suitable for use with the apparatus of FIG. 1.
Figure 8A:
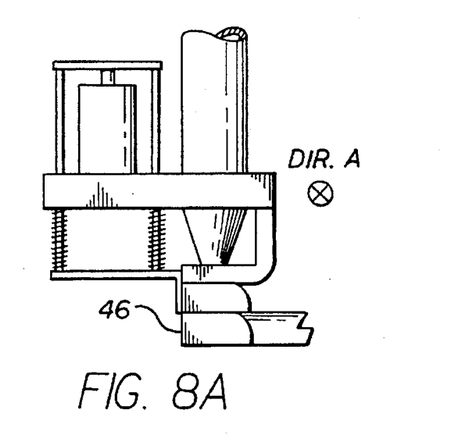
FIGS. 8A and 8B are side views illustrating the operation of the apparatus of FIG. 7.
Figure 8B:
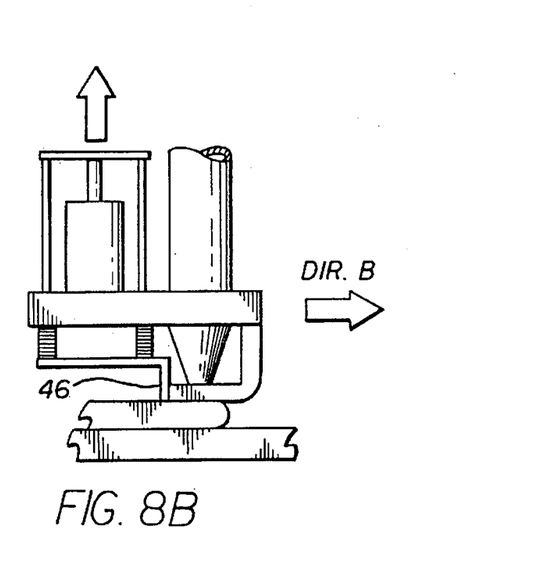

An alternative and simpler configuration for the extrusion nozzle 31 and top and side trowels 45, 46 is shown in FIG. 7. The nozzle 31 and the top trowel 45 are carried on a mounting block 75. The side trowel 46 is carried on guide rods 76 moving through the mounting block, with retraction springs 77 normally holding the lower edge of the side trowel above the bottom surface of the top trowel. A solenoid 78 or other drive mechanism such as a stepper motor, is carried on the mounting block 75 and when desired, pushes the side trowel downward to the position shown in FIG. 7. In this configuration, the side trowel is pushed downward when needed for forming a side wall, and is retracted upward when the nozzle is forming a wall of a hatch. Movement of the nozzle in the direction A is utilized for extruding an external wall and movement in direction B is utilized for extruding an internal wall of a structure such as is shown in FIG. 4. This operation is shown in FIGS. 8A and 8B. In FIG. 8A, the side trowel 46 is extended downward and the nozzle is moving into the paper, extruding a rim with a shaped side wall and a shaped top. In FIG. 8B, the side trowel 46 is retracted upward and the nozzle is moved sideways forming an internal wall with a shaped top, with no concern for side shaping.

Figure 9A:
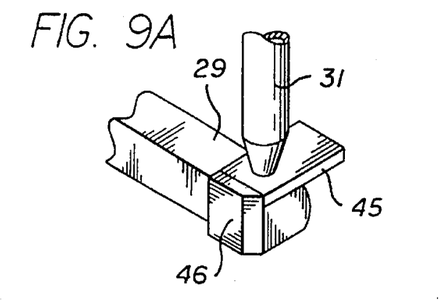
FIGS. 9A and 9B, 10A and 10B, and 11A and 11B diagrammatically illustrate the utilization of the apparatus in forming straight and curved walls.
Figure 9B:
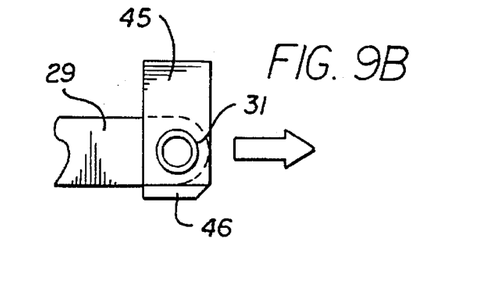
Figure 10A:
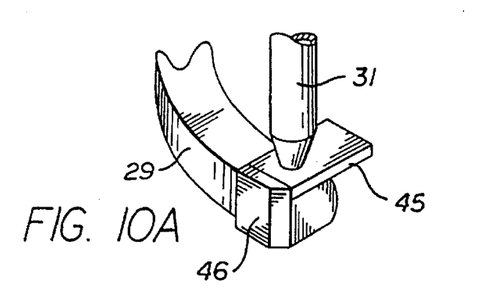
Figure 10B:
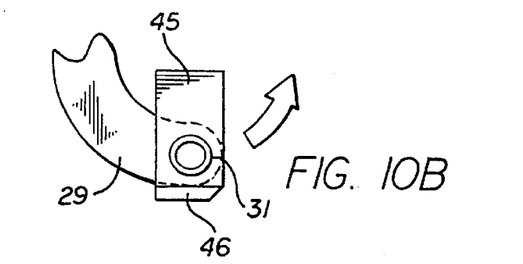
Figure 11A:
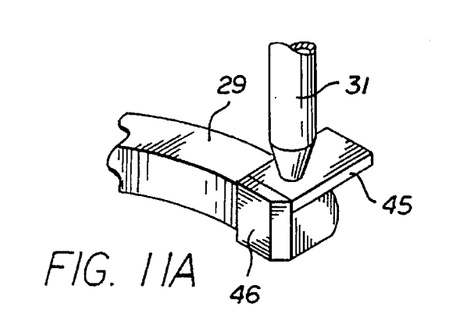
Figure 11B:
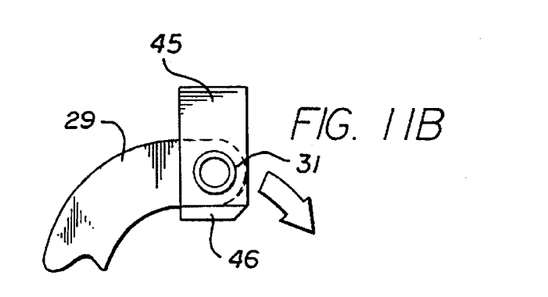

FIGS. 9A and 9B are a side perspective view and a top view, respectively, illustrating the forming of a straight wall or rim 29. The nozzle assembly can be rotated about the vertical nozzle access to provide other contours such as the concave shape shown in FIGS. 10A and 10B, and the convex shape shown in FIGS. 11A and 11B. Where adhesion of the construction material to a trowel is a problem, a coating of a non-stick synthetic resin polymer material, such as Teflon, may be utilized on the trowel surface.

A side trowel assembly with a curving trowel surface is illustrated in FIG. 15 and FIGS. 16A, 16B and 16C. This configuration provides a doubly curved convex or concave surface, such as exists as the outside and inside walls of a sphere. A side trowel 81 is formed of a sheet of flexible material, such as a thin steel sheet, and has an edge 82 and an opposite edge 83. A non-flexible section 84 is joined to the trowel 81 at the edge 83, with a spring 85 connected to the section 84. The spring 85 is positioned between the section 84 and a support plate 86. In the embodiment illustrated, the spring is normally in the expanded position of FIG. 16C and is pulled to the partially compressed position of FIG. 16A and the compressed position of FIG. 16B by a cable 87 in a sheath 88, for controlling the shape of the trowel 81. Alternatively, the spring 85 may be normal in the position of FIG. 16B and is extended to the positions of FIGS. 16A and 16C by a push rod which replaces the cable 87.

Figure 16A:
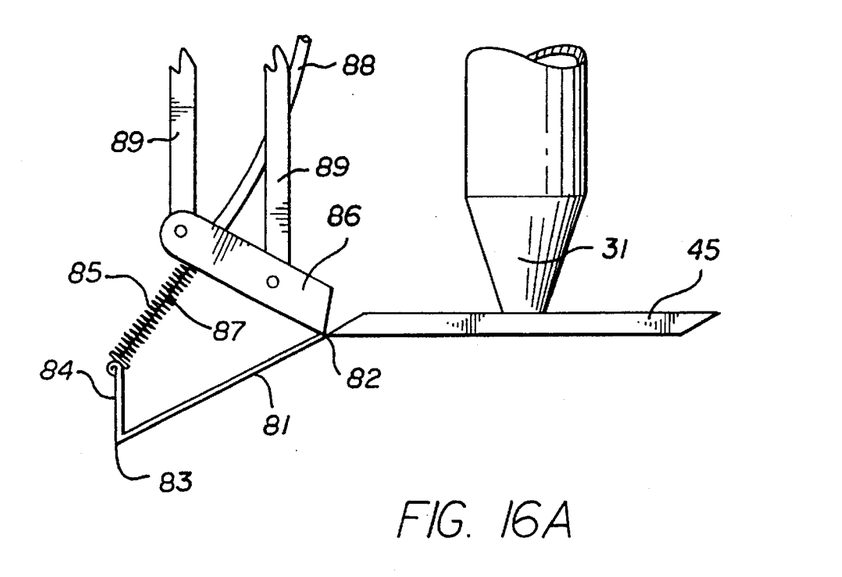
FIGS. 16A, 16B and 16C are side views illustrating the operation of the apparatus of FIG. 15.
Figure 16B:
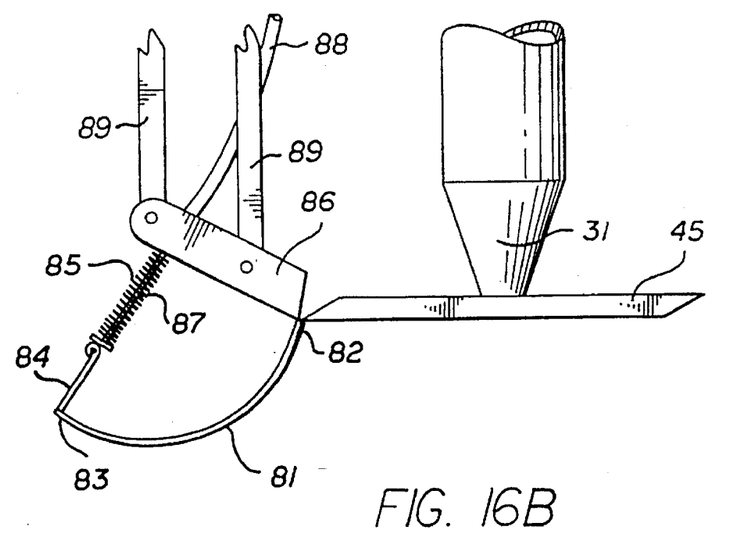
Figure 16C:
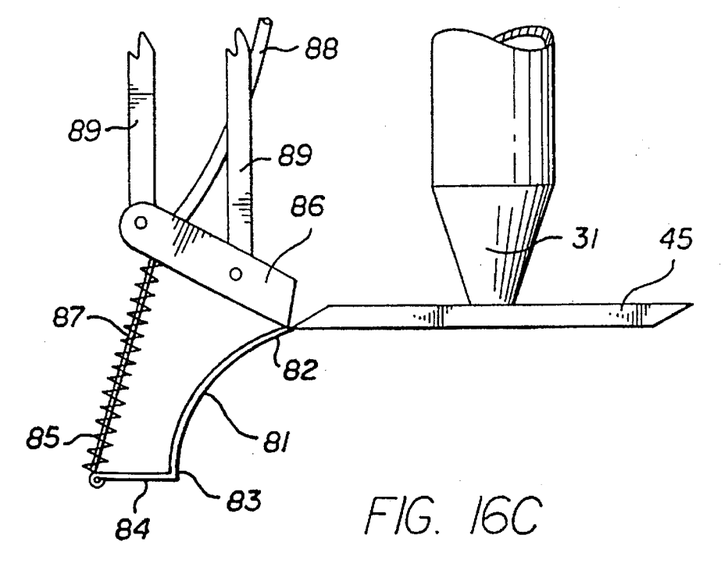

The support plate 86 positions the trowel edge 82 at an edge of the top trowel 45, as seen in FIG. 16A. The support plate 86 is carried on arms 89 attached to the extrusion assembly 22 for movement with the X arm 23.

The major advantages of the present invention include:

Surface Quality: Current additive processes generally generate objects in which all surfaces lack smoothness and the thickness of the fabrication layers is evident on them. Surface quality in the current methods is especially poor in oblique surfaces since they exhibit an obvious staircasing. Since the surface geometry in the new method is controlled by smooth trowels the positions of which are accurately controlled by computer, the object surfaces in the new method have a quality which is unprecedented in the rapid prototyping field.

Speed: In the current robotically guided extrusion approach the entire volume of the object must be scanned by the extrusion nozzle at the slow extrusion speed. As a result, it may take several hours to build even a small object, e.g., 5 hours for a 10 cubic centimeter object. The new method, on the other hand, creates only the periphery of each two-dimensional cross section and possibly a few walls for internal hatches using extrusion. Therefore, the time for the slow process of extrusion is dramatically reduced in the new method.

Another factor that impacts the speed of the new method is the layer thickness which may be variable and, in average, much larger than the usual layer thickness in other layering methods. The current photocuring techniques do not permit thick layers due to the curing penetration depth of the laser beam and ultraviolet flood lamp. The robotically guided extrusion cannot make thick layers since the external surfaces of the object will be very rough and inaccurate when thick volumes of material are extruded. The trowel system used in the new method allows for accurate and smooth layer edges regardless of the layer thickness.

Materials Used: The new method can use thermoplastics, and photopolymers as well as many other materials that are currently not used in rapid prototyping, e.g., plaster, cement, clay, concrete, etc. Another property in the new method is the possibility of feeding the extrusion nozzle or the pouring outlet from various input ports to eject a variety of materials or mixtures of materials, e.g., resins, to create various colors and other physical properties.

If some of the new system components, i.e., extrusion nozzle, trowels, and pouring mechanism, are made out of strong and high temperature resistant materials such as tungsten, then a variety of metals and alloys may be used to create metallic parts with accuracies comparable to those of parts produced by metal cutting or die casting processes.

Structural Properties: The structural properties of the current additive methods are generally not very good. This is mainly due to the bonding problems related to the geometry of solidified elements. For example, in laser photocuring the parabolic profile of a laser beam results in microscopic dispersal of cured regions in an uncured matrix. Likewise, in the robotically guided extrusion method, the cylindrical profile of extruded material may leave air gaps between various extruded depositions. In the new method each rectangular, honeycomb, or free form section of each layer is cured in its entirety. This results in better material properties. In addition, this process allows for mixing the resin with short fibers or other filler materials to reduce curing distortion and create strong composites. Another advantage of the new method is that better bonding between successive layers results as each layer is poured or injected on the top of the previous layer which is freshly solidified and is prone to near-perfect bonding.

Large Object Fabrication: Current layering methods of automated fabrication generally apply to small parts due to limitations in one or more components of the system used. For example, in selective photocuring the size of the area that can be effectively scanned by a laser beam is limited, and in flood lamp photomasking there is a practical limitation on the size of the mask. In the new method large objects such as furniture pieces, car bodies, boats, and building construction components, e.g., doors, windows, etc, may be built by controlling the large versions of the extrusion and pouring mechanisms by large gantry type robots. Conventional extrusion machines, such as those used in plastic extrusion, may be used in the new process for extruding various types of materials such as fiberglass.

Photocuring Without Laser or Masks: When using photopolymers in the conventional photocuring techniques, expensive laser generators or mask making processes, and a process of vacuuming uncured polymer lakes in various parts of each cured polymer layer are needed. The new technique allows the use of photocuring using one or more flood lamps without the need for mask making, since each layer of photopolymer liquid is contained by the extruded layer edges or rim in the new method.

Overhang Structures Fabrication: The pivoting side trowel design in the new method allows for fabrication of overhang sections that are not directly possible by other rapid prototyping methods.

Mold Making for Casting: The new method may be effectively used to create the internal surfaces of casting molds. For example, plaster paste may be used for extrusion of layer walls. The side trowel can be used for forming the inner, instead of the outer, surface of the external layers walls. Various types of materials may be poured within the layer walls. For example, if photopolymer resin is poured within the wall of each layer, then at the end of the process a complete polymer part with smooth surfaces will be created within a thin plaster shell which can be easily separated.

Lower Machine Cost: Compared to the current commercial machines that can match the precision (none will be able to match the surface quality) of the new process, it is expected that the commercial machines based on the new process will be significantly less expensive. The current processes that may be able to match the precision of the new process are selective photocuring processes that require either expensive laser generators, or expensive mask making modules. The most expensive part of the machines designed for the new process will be the conventional motion control mechanisms that are commonly used in the numerical control machines and industrial robots.

I claim:

1. An additive method of fabricating a product using a fluid construction material which can be solidified, trowel means defining first and second surfaces, and first nozzle means for delivering the fluid material to a predetermined location, including the steps of:

moving the first nozzle means along a predetermined path defining an enclosed area;

moving the trowel means along the predetermined path;

delivering fluid material to the first nozzle means to extrude the material from the first nozzle means in a layer as the first nozzle means is moved along the path, with the trowel means first and second surfaces producing a wall of the extruded material forming the enclosed area with a shaped outer surface and a shaped top surface; and delivering fluid material to the enclosed area, filling in the area enclosed by the wall to form a product.

2. A method as defined in claim 1 using a photocurable polymer as the construction material, and curing the material by directing radiation from a source onto the area.

3. A method as defined in claim 1 using a material which is solidified by cooling as the construction material, and solidifying the material by directing air from a source onto the area.

4. A method as defined in claim 1 including the steps of positioning the first and second trowel surfaces orthogonal to each other.

5. A method as defined in claim 1 including using first and second trowels to form the surfaces, and moving one of the trowels relative to the other trowel to adjust the angular relation of the shaped surfaces of the wall.

6. A method as defined in claim 1 including a trowel having a flexible surface, and flexing the trowel varying the curvature of the flexible surface and thereby the shaped outer surface of the wall.

7. A method as defined in claim 1 including selectively moving the trowel means along linear, concave, and convex paths.

8. A method as defined in claim 1 including moving the first nozzle means and trowel means along a predetermined path defining a plurality of enclosed areas, and moving the second nozzle means to position the second nozzle means at each enclosed area.

9. A method as defined in claim 8 including solidifying the material in each of the areas.

10. A method as defined in claim 1 including solidifying the material in the area.

11. A method as defined in claim 1 including sensing the level of material within the area and shutting off material flow at the second nozzle means when the level reaches a desired position.

12. A method as defined in claim 1 including moving the first nozzle means and the trowel means as a single unit.

13. An additive method of fabricating a product using a fluid construction material which can be solidified, trowel means defining a side surface, and first nozzle means for delivering the fluid material to a predetermined location, including the steps of:

moving the first nozzle means along a predetermined path defining an enclosed area;

moving the trowel means along the predetermined path;

delivering fluid material to the first nozzle means to extrude the material from the first nozzle means in a layer as the first nozzle means is moved along the path, with the trowel means side surface producing a wall of the extruded material forming the enclosed area with a shaped side surface and a top surface; and delivering fluid material to the enclosed area, filling in the area enclosed by the wall to form a product.

14. A method as defined in claim 13 including moving the trowel means to form a shaped top surface.

* * * * *